United States Patent
Neri et al.

[11] Patent Number: 5,669,481
[45] Date of Patent: Sep. 23, 1997

[54] METHOD OF BULK CONVEYING CIGARETTES

[75] Inventors: Armando Neri, Bologna; Mario Turra, Casalecchio di Reno, both of Italy

[73] Assignee: G.D Societa' per Azioni, Bologna, Italy

[21] Appl. No.: 662,494

[22] Filed: Jun. 13, 1996

[30] Foreign Application Priority Data

Jun. 22, 1995 [IT] Italy .............. BO95A0315

[51] Int. Cl.⁶ ........................... B65G 1/00
[52] U.S. Cl. ........................... 198/347.3
[58] Field of Search ............ 198/347.1, 347.2, 198/347.3

[56] References Cited

U.S. PATENT DOCUMENTS

| | | | |
|---|---|---|---|
| 3,921,790 | 11/1975 | Hinchcliffe et al. | 198/347.3 X |
| 4,120,391 | 10/1978 | Molins et al. | 198/347.3 |
| 4,200,181 | 4/1980 | Clarke | 198/347.3 X |
| 4,344,445 | 8/1982 | Seragnoli | 198/347.3 X |
| 4,353,454 | 10/1982 | Tolasch et al. | 198/347.3 |
| 5,439,092 | 8/1995 | Hierons | 198/347.3 |

FOREIGN PATENT DOCUMENTS

| | | | |
|---|---|---|---|
| 0581189 | 2/1994 | European Pat. Off. | |
| 1299175 | 12/1972 | United Kingdom . | |
| 1408926 | 10/1975 | United Kingdom | 198/347.3 |
| 2065057 | 6/1981 | United Kingdom . | |
| 2132969 | 7/1984 | United Kingdom | 198/347.3 |

*Primary Examiner*—James R. Bidwell
*Attorney, Agent, or Firm*—Ladas & Parry

[57] ABSTRACT

A method of bulk conveying cigarettes, whereby a mass of cigarettes is fed along a path by a reversible conveying line defined by a first and second conveyor for masses of cigarettes; the first conveyor defining a closed-top channel for a stream of cigarettes; the second conveyor being an open-top conveyor, and being operated at a speed at most equal to the speed of the first conveyor when the cigarettes are transferred from the first conveyor to the second conveyor; and the second conveyor being operated at a speed at least equal to the speed of the first conveyor when the cigarettes are transferred from the second conveyor to the first conveyor.

7 Claims, 1 Drawing Sheet

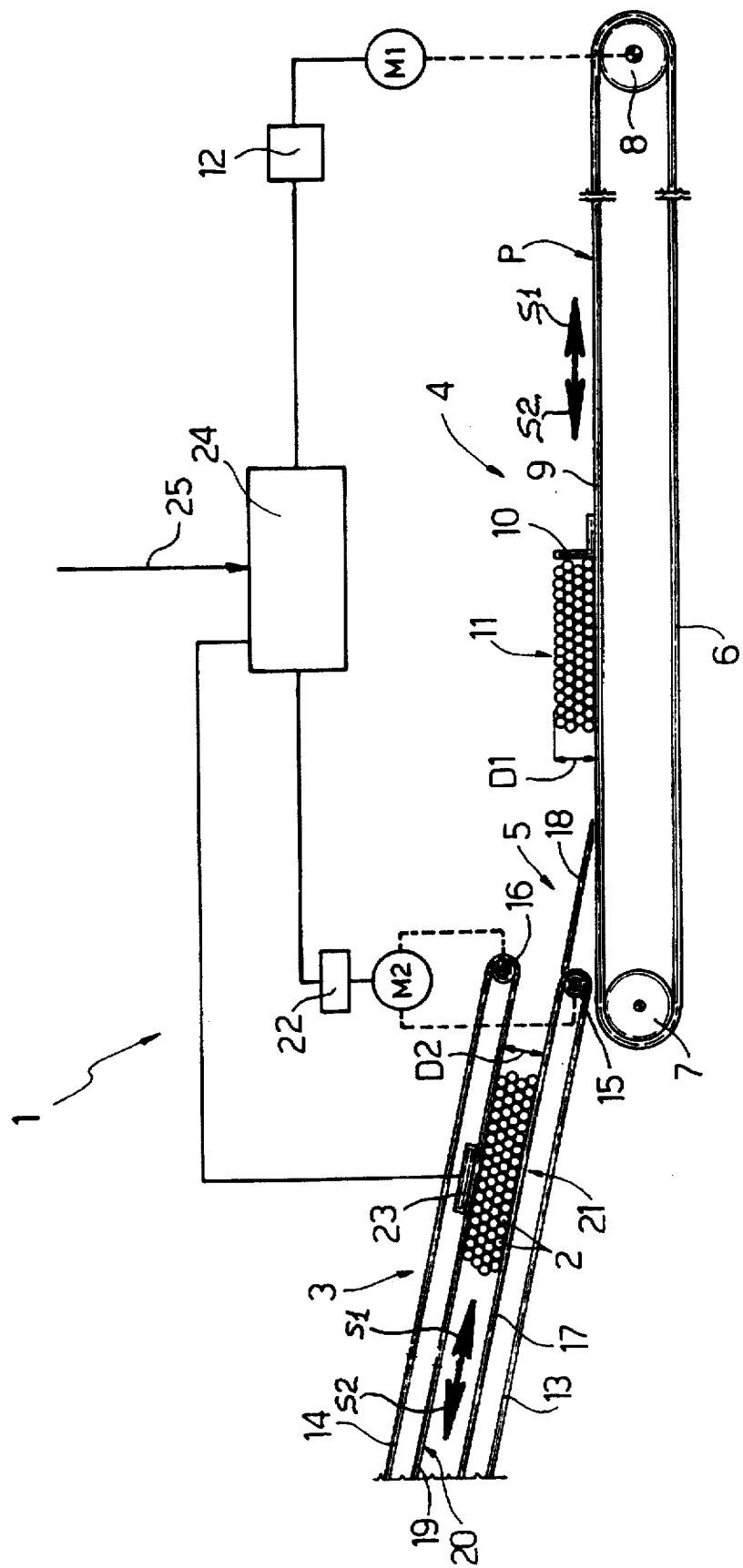

METHOD OF BULK CONVEYING CIGARETTES

BACKGROUND OF THE INVENTION

The present invention relates to a method of bulk conveying cigarettes.

More specifically, the present invention relates to a method of bulk conveying cigarettes, of the type comprising the step of feeding a mass of cigarettes along a path defined by a reversible conveying line comprising a first and second conveyor for masses of cigarettes; the first conveyor defining a closed-top channel for a stream of cigarettes and being operated at a first speed; and the second conveyor being an open-top conveyor operated at a second speed.

The present invention is particularly advantageous in the running of a compensating store connected to a line supplying masses of cigarettes from a manufacturing machine to a packing machine; the store comprising a variable-capacity reservoir for cigarettes, defined by a reversible conveyor (second conveyor) and by a reversible loading-unloading end conveyor (first conveyor) for loading and unloading the cigarettes into and from the reservoir; the reversible conveyor of the reservoir being an open-top conveyor for supporting a layer of cigarettes of varying length and substantially constant thickness; and the end conveyor normally being defined by two endless belts respectively comprising a transportation branch and a pressure branch located side by side and defining a conveying channel for a layer of cigarettes of given thickness.

The two conveyors of supply lines of the above type are normally driven by a single reversible motor, so that the traveling speeds, always in the same direction, of the two conveyors are maintained equal. Such a method at times presents drawbacks, especially when the cigarettes are transferred from the first conveyor to the second. In fact, normally, the cigarettes are compressed inside the channel defined by the first conveyor and, when transferred onto the second conveyor, expand to form, on the second conveyor, a layer thicker than the height of the channel of the first conveyor. As such, when the traveling direction of the two conveyors is inverted to feed the cigarettes from the second conveyor to the first, the thicker layer encounters difficulty in entering the channel of the first conveyor, thus resulting at times in jamming and hence stoppage of the supply line as a whole.

SUMMARY OF THE INVENTION

It is an object of the present invention to provide a method of controlling reversible conveying lines of the above type, designed to overcome the aforementioned drawback.

According to the present invention, there is provided a method comprising the step of feeding a mass of cigarettes along a path defined by a reversible conveying line comprising a first and second conveyor for masses of cigarettes; the first conveyor defining a closed-top channel for a stream of cigarettes, and being operated at a first speed; the second conveyor being an open-top conveyor, and being operated at a second speed; and both the conveyors being operated selectively in a first direction to transfer the cigarettes from the first conveyor to the second conveyor, and in a second direction to transfer the cigarettes from the second conveyor to the first conveyor; the method being characterized in that, when the two conveyors are operated in the first direction, said two speeds are so regulated that said second speed is at least equal to the first speed; whereas, when the two conveyors are operated in the second direction, said two speeds are so regulated that said second speed is at most equal to the first speed.

According to a preferred embodiment of the above method, when the two conveyors are operated in the first direction, said two speeds are so regulated that said second speed is greater than the first speed; whereas, when the two conveyors are operated in the second direction, said two speeds are so regulated that said second speed is substantially equal to the first speed.

According to a further preferred embodiment of the above method, when the two conveyors are operated in the first direction, said two speeds are so regulated that said second speed is substantially equal to the first speed; whereas, when the two conveyors are operated in the second direction, said two speeds are so regulated that said second speed is less than the first speed.

BRIEF DESCRIPTION OF THE DRAWING

The present invention will be described with reference to the accompanying drawing, which shows, schematically, a conveying line controlled using the method according to the invention.

DETAILED DESCRIPTION OF THE INVENTION

Numeral 1 in the accompanying drawing indicates a reversible conveying line for feeding masses of cigarettes 2 along a given path P extending along line 1, and which is connected to a supply line (not shown) for feeding masses of cigarettes 2 from a cigarette manufacturing machine (not shown) to a packing machine (not shown).

Line 1 comprises two reversible conveyors 3 and 4 for masses of cigarettes 2 and located substantially in series along path P; and a loading-unloading station 5 where, in use, the mass of cigarettes 2 is transferred from conveyor 3 to conveyor 4 and vice versa.

Conveyor 4 is a reversible open-top conveyor, and comprises a conveyor belt 6 looped about two pulleys 7 and 8 between which is interposed station 5. Pulley 8 is powered by a reversible motor M1, and belt 6 presents a transportation branch 9, for cigarettes 2, extending along path P and fitted with an end stop bracket 10. Branch 9 supports a layer 11 of cigarettes 2 of varying length and substantially constant thickness D1, and is driven by motor M1 so as to move bracket 10—in both directions along path P and at an adjustable speed V1 controlled by a speed regulator 12 connected to motor M1—between a first limit position (not shown) corresponding to a minimum length of layer 11 and wherein bracket 10 is located close to station 5, and a second limit position (not shown) corresponding to a maximum length of layer 11 and wherein bracket 10 is located close to pulley 8. In one embodiment (not shown) of line 1, conveyor 4 forms part of a variable-capacity store (not shown) for masses of cigarettes 2, and wherein said first and second limit positions correspond to a minimum and maximum capacity respectively of the store.

Conveyor 3 comprises a lower conveyor belt 13 and an upper conveyor belt 14 located in facing relation one over the other, and looped about respective pulleys 15 and 16, of which only those powered by a reversible motor M2 are shown. Belt 13 presents an upper transportation branch 17 substantially tangent to the surface of branch 9 of conveyor 4 at station 5, and connected to branch 9 by a fixed bridge plate 18 fitted in known manner to the shaft (not shown) supporting pulley 15; and belt 14 presents a lower pressure branch 19 parallel to branch 17 and separated from branch 17 by a given distance D2. Upper branch 17 and lower branch 19 define a channel 20 for conveying a layer 21 of cigarettes 2, the thickness of which layer 21 is equal to distance D2 and less than the thickness D1 of layer 11 of cigarettes 2 on branch 9; and are driven simultaneously by motor M2 to feed layer 21 in both directions along channel 20 and at a substantially constant speed V2 detected by a speed sensor 22 connected to motor M2. Channel 20 is inclined at an angle, in relation to the horizontal, greater than branch 9 of conveyor 4.

Conveyor 3 also comprises a known pressure detector 23, located along lower pressure branch 19, for detecting the tension of branch 19 produced by the pressure exerted, in use, on branch 19 by layer 21 of cigarettes 2 traveling through channel 20.

Operation of conveying line 1 is controlled by a known control unit 24 connected to speed regulator 12 of motor M1, to speed sensor 22 of motor M2, and to pressure detector 23, and which presents an input 25 for an enabling signal for operating line 1 and depending, for example, on the operating conditions of said supply line (not shown).

Depending on the type of enabling signal supplied to input 25, unit 24 selectively operates both conveyors 3 and 4 in a first direction (S1) to transfer cigarettes 2 from conveyor 3 to conveyor 4 at station 5, and in a second direction (S2) for transferring cigarettes 2, again at station 5, from conveyor 4 to conveyor 3.

When conveyors 3 and 4 are operated in the first direction S1, unit 24 regulates speed V1 so that it is greater than speed V2; and, when conveyors 3 and 4 are operated in the second direction S2, unit 24 regulates speed V1 so that it is substantially equal to speed V2.

On conveyor 3, cigarettes 2 are compressed inside channel 20, whereas, on conveyor 4, they are positioned freely on transportation branch 9. Consequently, on being transferred from conveyor 3 to conveyor 4, the cigarettes 2 in layer 21 of thickness D2 expand on branch 9 of conveyor 4 to form layer 11 of thickness D1, which, if speed V1 were not greater than speed V2, would be greater than thickness D2, so that, when conveyors 3 and 4 are operated in second direction S2, some of the cigarettes 2 in layer 11 would have difficulty in re-entering, or would fail entirely to re-enter, channel 20, thus resulting in a jam at loading-unloading station 5. By virtue of speed V1 being greater than speed V2, however, cigarettes 2 in layer 11 are so arranged on branch 9 that thickness D1 is substantially equal to thickness D2, so that, when transferring cigarettes 2 from conveyor 4 to conveyor 3, control unit 24 need simply maintain speed V1 substantially equal to speed V2.

Alternatively, when conveyors 3 and 4 are operated in first direction S1, unit 24 may regulate speed V1 so that it is substantially equal to speed V2; and, when conveyors 3 and 4 are operated in second direction S2, unit 24 may regulate speed V1 so that it is less than speed V2.

In this case, feeding cigarettes 2 in first direction S1 with conveyors 3 and 4 operating at the same speed, thickness D1, for the reasons explained above, will be greater than thickness D2, so that conveyor 4 will have to be operated at a speed V1 less than speed V2 of conveyor 3 to feed cigarettes 2 in second direction S2.

Operation of the unit may be made fully independent of unit 24, in which case, to transfer cigarettes 2 smoothly from conveyor 4 to conveyor 3, the ratio of speeds V1 and V2, determined on the basis of average D1 and D2 values, need simply be set beforehand.

We claim:

1. A method of bulk conveying cigarettes (2), the method comprising feeding a mass of cigarettes (2) along a path (P) defined by a reversible conveying line (1) comprising a first conveyor (3) and a second conveyor (4) for masses of cigarettes (2); the first conveyor (3) defining a closed-top channel (20) for a stream of cigarettes (2), and being operated at a first speed (V2); the second conveyor (4) being an open-top conveyor, and being operated at a second speed (V1); operating both the conveyors (3, 4) in a first direction (S1) to transfer the cigarettes (2) from the first conveyor (3) to the second conveyor (4), and in a second direction (S2) to transfer the cigarettes (2) from the second conveyor (4) to the first conveyor (3); and regulating said two speeds (V1, V2) so that, when the two conveyors (3, 4) are operated in the first direction (S1), said second speed (V1) is at least equal to the first speed (V2); whereas, when the two conveyors (3, 4) are operated in the second direction (S2), said second speed (V1) is at most equal to the first speed (V2), the speeds of the first and second conveyors being different from one another in one of said directions so that in said second direction, the stream of cigarettes being transferred from the second conveyor to the first conveyor will have the same thickness on both conveyors.

2. A method as claimed in claim 1, wherein when the two conveyors (3, 4) are operated in the first direction (S1), said two speeds (V1, V2) are so regulated that said second speed (V1) is greater than the first speed (V2); whereas, when the two conveyors (3, 4) are operated in the second direction (S2), said two speeds (V1, V2) are so regulated that said second speed (V1) is substantially equal to the first speed (V2).

3. A method as claimed in claim 1, wherein when the two conveyors (3, 4) are operated in the first direction (S1), said two speeds (V1, V2) are so regulated that said second speed (V1) is substantially equal to the first speed (V2); whereas, when the two conveyors (3, 4) are operated in the second direction (S2), said two speeds (V1, V2) are so regulated that said second speed (V1) is less than the first speed (V2).

4. A method as claimed in claim 1, wherein a value of the ratio of said first (V2) and second (V1) speeds is a function of a pressure inside said channel (20).

5. A method as claimed in claim 1, wherein said first speed (V2) is substantially constant.

6. A method of providing a variable capacity reservoir for cigarettes in a conveying line for the cigarettes, said method comprising, feeding a mass of cigarettes along a path in opposite directions to and from a main cigarette conveyor line to provide a variable capacity reservoir of cigarettes for said main cigarette conveying line, forming said path by first and second conveyors, the first conveyor being associated with the main cigarette conveyor line to selectively remove and supply cigarettes thereto, the second conveyor being associated with the first conveyor to selectively receive cigarettes therefrom and return cigarettes thereto, said first conveyor defining a closed-top channel in which the cigarettes are conveyed in a stream, under pressure, at a determined thickness, said second conveyor being an open-top conveyed on which the cigarettes are conveyed without pressure in a stream at a respective determined thickness, operating the first and second conveyors in a first direction to transfer the cigarettes from the main cigarette conveyor line to the first conveyor and from the first conveyor to the second conveyor and in a second, opposite direction to transfer the cigarettes from the second conveyor to the first conveyor and to the main cigarette line the first and second conveyors being respectively and independently driveable at variable speeds in said first and second directions, and regulating the speed of said first and second conveyors in said first and second directions to provide a difference in speed between said first and second conveyors in at least one of said directions to compensate for differences in thickness of said stream of cigarettes arising from transfer between the closed-top first conveyor and the open-top second conveyor so as to maintain a substantially equal thickness of said stream of cigarettes on both said first and second conveyors when conveying said cigarettes from said second conveyor to said first conveyor.

7. A method as claimed in claim 6 comprising controlling said difference in speed between said first and second conveyors to provide a ratio of the speeds of the conveyors which is a function of the pressure on the stream of cigarettes in the closed-top channel of the first conveyor.

* * * * *